United States Patent
Muthiah (10) Patent No.: US 11,288,007 B2
(45) Date of Patent: Mar. 29, 2022

(54) VIRTUAL PHYSICAL ERASE OF A MEMORY OF A DATA STORAGE DEVICE

(71) Applicant: WESTERN DIGITAL TECHNOLOGIES, INC., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 301 days.

(21) Appl. No.: 16/414,450

(22) Filed: May 16, 2019

(65) Prior Publication Data

US 2020/0363980 A1  Nov. 19, 2020

(51) Int. Cl.
*G06F 3/06* (2006.01)
*G06F 12/10* (2016.01)

(52) U.S. Cl.
CPC .......... *G06F 3/0652* (2013.01); *G06F 3/0604* (2013.01); *G06F 3/0679* (2013.01);
(Continued)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20;
(Continued)

(56) References Cited

U.S. PATENT DOCUMENTS 6,581,132 B1 * 6/2003 Kakinuma .......... G06F 12/0246
                                                    711/103
9,081,943 B2 * 7/2015 Nagai .................... G06F 3/0679
(Continued)

OTHER PUBLICATIONS

Improving 3D NAND Flash Memory Lifetime by Tolerating Early Retention Loss and Process Variation; Luo, Yixin et al.; Nov. 11, 2018 ; retrieved from https://arxiv.org/pdf/1807.05140.pdf on May 7, 2021 (Year: 2018).*

(Continued)

*Primary Examiner* — Daniel C. Chappell
(74) *Attorney, Agent, or Firm* — Michael Best & Friedrich LLP (57) ABSTRACT

Virtual physical erase of a memory of a data storage device. One example data storage device may include a flash memory. The data storage device further may include an electronic processor that may be configured to store a first portion of data in the flash memory, and receive a physical erase request from an access device. The electronic processor may be further configured to identify a first block of the flash memory and a memory fragment of the first block where the first portion of data is stored in the flash memory. The electronic processor may be further configured to, in response to receiving the physical erase request, program one or more cells corresponding to the memory fragment to an increased voltage state so as to obfuscate the first portion of data that is stored in the flash memory.

20 Claims, 3 Drawing Sheets

(52) U.S. Cl.
CPC ...... *G06F 12/10* (2013.01); *G06F 2212/7201* (2013.01); *G06F 2212/7205* (2013.01)

(58) Field of Classification Search
CPC ........ G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | |
|---|---|---|---|
| 10,216,575 B2 | 2/2019 | Mukhopadhyay et al. | |
| 10,552,058 B1* | 2/2020 | Jadon ................... | G06F 11/1068 |
| 10,649,969 B2* | 5/2020 | De ...................... | G06F 16/2255 |
| 2005/0036390 A1* | 2/2005 | Nakada ................. | G11B 20/18 |
| | | | 365/232 |
| 2005/0068808 A1* | 3/2005 | Quader ................. | G11C 16/14 |
| | | | 365/185.18 |
| 2006/0282644 A1* | 12/2006 | Wong .................. | G06F 12/0246 |
| | | | 711/206 |
| 2008/0065815 A1* | 3/2008 | Nasu ...................... | G06F 3/0688 |
| | | | 711/103 |
| 2008/0147964 A1* | 6/2008 | Chow .................... | G06F 21/32 |
| | | | 711/103 |
| 2008/0219053 A1* | 9/2008 | Kim .................... | G11C 16/3418 |
| | | | 365/185.11 |
| 2009/0125668 A1* | 5/2009 | Huhne ................ | G06F 12/0246 |
| | | | 711/103 |
| 2010/0023721 A1* | 1/2010 | Ito ....................... | G06F 12/0246 |
| | | | 711/166 |
| 2010/0074004 A1* | 3/2010 | Parker ................. | G11C 11/5671 |
| | | | 365/185.03 |
| 2010/0074005 A1* | 3/2010 | Parker ................. | G11C 16/3486 |
| | | | 365/185.03 |
| 2010/0074006 A1* | 3/2010 | Parker ................. | G11C 16/3486 |
| | | | 365/185.03 |
| 2010/0074007 A1* | 3/2010 | Parker ................. | G11C 16/3486 |
| | | | 365/185.03 |
| 2010/0074009 A1* | 3/2010 | Parker ................. | G11C 11/5671 |
| | | | 365/185.03 |
| 2010/0095054 A1* | 4/2010 | Terasaki .............. | G06F 12/0246 |
| | | | 711/103 |
| 2010/0205352 A1* | 8/2010 | Chu ....................... | G11C 29/82 |
| | | | 711/103 |
| 2011/0055458 A1* | 3/2011 | Kuehne ............... | G06F 12/0246 |
| | | | 711/103 |
| 2011/0161560 A1* | 6/2011 | Hutchison ........... | G06F 12/0246 |
| | | | 711/103 |
| 2012/0096456 A1* | 4/2012 | Shapiro ..................... | G06F 8/62 |
| | | | 717/177 |
| 2012/0246393 A1* | 9/2012 | Hashimoto ......... | G06F 12/0246 |
| | | | 711/103 |
| 2014/0006695 A1* | 1/2014 | Makuni ............... | G06F 12/0246 |
| | | | 711/103 |
| 2014/0075094 A1* | 3/2014 | Alrabady ............... | G11C 16/10 |
| | | | 711/103 |
| 2014/0372673 A1* | 12/2014 | Higeta ................ | G06F 12/0246 |
| | | | 711/103 |
| 2014/0372675 A1* | 12/2014 | Higeta ................ | G06F 12/0246 |
| | | | 711/103 |
| 2016/0283322 A1* | 9/2016 | Yamashita ............ | G06F 3/0604 |
| 2016/0306590 A1* | 10/2016 | Kang .................... | G06F 3/0608 |
| 2017/0148526 A1* | 5/2017 | Li ........................ | G11C 11/5642 |
| 2017/0364298 A1* | 12/2017 | Choi ................... | G06F 11/1068 |
| 2018/0129563 A1* | 5/2018 | Kim .................... | G06F 12/1009 |
| 2018/0341418 A1* | 11/2018 | Ki .......................... | G11C 29/52 |
| 2019/0066799 A1* | 2/2019 | Luo ........................ | G11C 16/16 |
| 2019/0155755 A1* | 5/2019 | Liang ....................... | H04L 9/06 |
| 2020/0213138 A1* | 7/2020 | Mondello .............. | G11C 16/14 |

OTHER PUBLICATIONS

K. Onarlioglu, W. Robertson and E. Kirda, "Eraser: Your Data Won't Be Back," 2018 IEEE European Symposium on Security and Privacy (EuroS&P), 2018, pp. 153-166, doi: 10.1109/EuroSP.2018.00019. (Year: 2018).*

H. Kwon, R. Jin and T. Chung, "AB-FTL: An alternative block Flash Translation Layer using locality-aware technique," 2011 IEEE 2nd International Conference on Networked Embedded Systems for Enterprise Applications, 2011, pp. 1-8, doi: 10.1109/NESEA.2011.6144952. (Year: 2011).*

H. Chang, C. Ho, Y. Chang, Y. Chang and T. Kuo, "How to enable software isolation and boost system performance with sub-block erase over 3D flash memory," 2016 International Conference on Hardware/Software Codesign and System Synthesis (CODES+ ISSS), 2016, pp. 1-10. (Year: 2016).*

I. Shin, "Implementing secure file deletion in NANDbased block devices with internal buffers," in IEEE Transactions on Consumer Electronics, vol. 58, No. 4, pp. 1219-1224, Nov. 2012, doi: 10.1109/TCE.2012.6414988. (Year: 2012).*

Kang et al., "A Superblock-based Flash Translation Layer for NAND Flash Memory," 2006, EMSOFT '06 Proceedings of the 6th ACM & IEEE International conference on Embedded software, pp. 161-170.

* cited by examiner

VIRTUAL PHYSICAL ERASE OF A MEMORY OF A DATA STORAGE DEVICE

BACKGROUND

This application relates generally to securely erasing a memory of a data storage device.

A memory, such as a flash memory, may be accessed by many applications, some of which store highly sensitive data and others of which do not store highly sensitive data. Thus, the memory may provide a "secure write" and a "secure read" interface for applications to ensure the security of data stored in the memory. Similarly, some applications that access the memory may require high levels of security for data that is erased from the memory. Conventional approaches to erasing the memory include a "logical erase" where flash transition layer (FTL) mapping of the portion of the memory to be erased is removed from a control table such that any access to that portion of the memory is avoided. However, by using a "logical erase," the data in the portion of the memory is still physically present in the memory and, thus, potentially accessible. While a memory may be physically erased in some situations, physical erasing of the memory (e.g., flash memory) has been limited to erasing an entire block of the memory. However, physically erasing an entire block of the memory requires a number of additional steps (e.g., compaction of large amounts of data that is not to be erased but is stored within the block that is to be erased) when the portion of data to be physically erased is less than an entire block.

BRIEF SUMMARY OF THE DISCLOSURE

Various aspects as set forth in the description relate to devices and methods for securely erasing a portion of data stored in a memory without physically erasing an entire block of the memory when the portion of data to be erased is less than an entire block of the memory. In some embodiments, the disclosed devices and methods increase performance and NAND endurance of the memory, and decrease power consumption, processing time, and write amplification of the memory during a secure erase process.

In one example aspect set forth in the description, there is provided a data storage device that may include a flash memory that includes a plurality of blocks that include a plurality of word lines. The data storage device further may include an electronic processor that may be configured to store a first portion of data in the flash memory, and receive a physical erase request from an access device. The physical erase request may indicate that the first portion of data is to be physically erased from the flash memory. The electronic processor may be further configured to identify a first block of the flash memory and a memory fragment of the first block where the first portion of data is stored in the flash memory. The electronic processor may be further configured to, in response to receiving the physical erase request, program one or more cells corresponding to the memory fragment to an increased voltage state so as to obfuscate the first portion of data that is stored in the flash memory.

In some embodiments of the above-described data storage device, the electronic processor is configured to program the one or more cells corresponding to the memory fragment to the increased voltage state by programming the one or more cells corresponding to the memory fragment to a highest programmable voltage state so as to obfuscate the first portion of data that is stored in the flash memory in response to receiving the physical erase request. In some embodiments of the above-described data storage device, the electronic processor is configured to program the one or more cells corresponding to the memory fragment to the increased voltage state by randomly programming the one or more cells corresponding to the memory fragment to a random increased voltage state based on a random key so as to obfuscate the first portion of data that is stored in the flash memory in response to receiving the physical erase request.

In another example aspect set forth in the description, there is provided a method of performing a virtual physical erase of a data storage device. The method may include storing, with an electronic processor, a first portion of data in a flash memory of the data storage device. The flash memory may include a plurality of blocks that include a plurality of word lines. The method may further include receiving, with the electronic processor, a physical erase request from an access device. The physical erase request may indicate that the first portion of data is to be physically erased from the flash memory. The method may further include identifying, with the electronic processor, a first block of the flash memory and a memory fragment of the first block where the first portion of data is stored in the flash memory. The method may further include, in response to receiving the physical erase request, programming, with the electronic processor, one or more cells corresponding to the memory fragment to an increased voltage state so as to obfuscate the first portion of data that is stored in the flash memory.

In some embodiments of the above-described example method, programming the one or more cells to the increased voltage state includes programming the one or more cells corresponding to the memory fragment to a highest programmable voltage state so as to obfuscate the first portion of data that is stored in the flash memory in response to receiving the physical erase request. In some embodiments of the above-described example method, programming the one or more cells to the increased voltage state includes randomly programming the one or more cells corresponding to the memory fragment to a random increased voltage state based on a random key so as to obfuscate the first portion of data that is stored in the flash memory in response to receiving the physical erase request In this manner, various aspects set forth in the description provide for improvements in at least the technical fields of memory devices and their design and architecture.

Various aspects set forth in the description can be embodied in various forms, including hardware or circuits controlled by computer-implemented methods, computer program products, computer systems and networks, user interfaces, and application programming interfaces; as well as hardware-implemented methods, signal processing circuits, memory arrays, application specific integrated circuits, field programmable gate arrays, and the like. The foregoing summary is intended solely to give a general idea of various aspects set forth in the description, and does not limit the scope of the description in any way.

DESCRIPTION OF THE DRAWINGS

These and other more detailed and specific features of various embodiments are more fully disclosed in the following description, reference being had to the accompanying drawings, in which.

DETAILED DESCRIPTION

Particular aspects of set forth in the description are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). As used herein, "exemplary" may indicate an example, an implementation, and/or an aspect, and should not be construed as limiting or as indicating a preference or a preferred example, implementation, and/or aspect.

As explained above, some applications that access a memory, such as a flash memory, may require high levels of security for data that is erased from the memory (e.g., to ensure that the erased data cannot be accessed after it has been erased). While a memory may be physically erased in some situations to ensure that the erased data is not accessible, physical erasing of the memory has been limited to erasing an entire block of the memory. However, physical erasing of an entire block of the memory requires a number of additional steps when the portion of data to be physically erased is less than an entire block of the memory, as is often the case. In other words, physical erasing a portion of the memory is only possible at block granularity as opposed to physically erasing data at a finer level, such as at word line granularity or at cell granularity. Thus, to physically erase a small portion of data (e.g., a 4 KB frame memory unit of a 12 MB block), the memory identifies the block in which the small portion of data is stored, relocates all other data stored in the block to one or more other blocks of the memory (i.e., performs compaction), and then physically erases the entire block by resetting all cells in the block to their lowest voltage state. This process may be tedious in many situations as a significantly larger amount of data (e.g., over 11 MB) than the amount of data being erased (e.g., 4 KB) undergoes compaction to be relocated to other blocks in the memory before the small portion of data is physically erased by erasing the entire block in which the small portion of data is located.

This high amount of compaction decreases performance of the memory by consuming additional power, taking additional processing time to perform, increasing write amplification, and decreasing NAND endurance. For example, the memory may have a finite number of "program/erase" (P/E) cycles before the memory can no longer be used. For high security applications that frequently perform physical erasing of portions of the memory, a conventional memory may undergo many additional P/E cycles due to compaction before physical erasing of a block of memory. Therefore, reducing compaction using the devices and methods described herein may, among other advantages, increase the NAND endurance of the memory by reducing the number of P/E cycles that are undergone during compaction when the memory is performing a physical erase of stored data.

Various aspects as set forth in the description describe devices and methods for securely erasing a portion of data stored in a memory without physically erasing an entire block of the memory when the portion of data to be erased is smaller than an entire block. In some embodiments, the disclosed devices and methods increase performance and NAND endurance of the memory, and decrease power consumption, processing time, and write amplification of the memory by reducing or eliminating compaction that occurs in conventional memories that are configured to securely erase stored data only through physical block erase methods.

Figure 1:
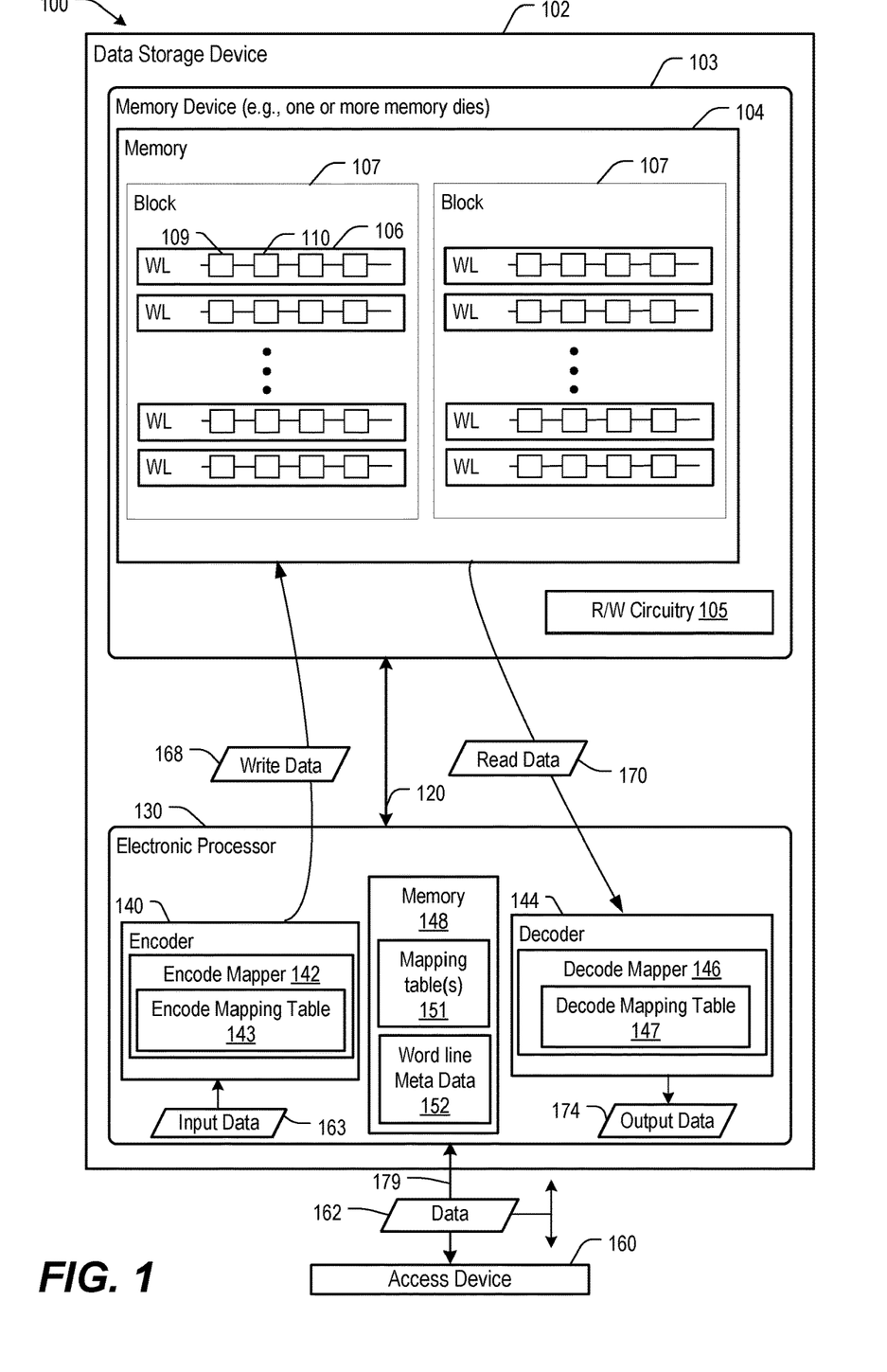
FIG. 1 is a block diagram of an example of a system that includes an access device and a data storage device configured to perform virtual physical erasing of a portion of a memory of a memory device of the data storage device.

FIG. 1 depicts an illustrative example of a system 100 that includes a data storage device 102 and an access device 160. The data storage device 102 includes an electronic processor 130 (e.g., a memory controller) and a memory device 103 (e.g., one or more memory dies) that is coupled to the electronic processor 130. In some embodiments, the electronic processor 130 includes a microprocessor or other electronic device, and includes input and output interfaces to couple to components of the access device 160 and/or other components of the data storage device 102 (e.g., the memory device 103). In some embodiments, the memory device 103 includes a memory 104 as explained in greater detail below.

In some embodiments, the electronic processor 130 includes an encoder 140, a decoder 144, and a memory 148. The electronic processor 130 may receive or generate input data 163 to be stored at the memory device 103. The input data 163 may be provided to the encoder 140. The encoder 140 is configured to transform the input data 163 to generate encoded data (i.e., write data 168) that is stored in the memory device 103. For example, the encoder 140 may include an encode mapper 142 configured to map the input data 163 to corresponding write data 168 using an encode mapping table 143. In some embodiments, the input data 163 is transferred from the encoder 140 through one or more write buffers (not shown) before being stored in the memory device 103 to generate the write data 168. A write operation may be performed to program a storage element of the memory 104 of the memory device 103 to a voltage state based on the write data 168 received from the encoder 140 and/or the one or more write buffers.

After the write data 168 is stored to the memory device 103, a read operation may be performed on the storage element to generate read data 170. The read data 170 may correspond to a voltage state of the storage element of the memory device 103. The read data 170 may be provided to the decoder 144 that is configured to transform the read data 170 to generate decoded data (e.g., output data 174). For example, the decoder 144 may include a decode mapper 146 configured to initialize a transformation table (e.g., a decode mapping table 147) that is configured to indicate a mapping of a group of bits (of the read data 170) to a decoded group of bits (of the output data 174). The transformation table may be a static table or a dynamic table. In some embodiments, the read data 170 may be stored in one or more read buffers (not shown) prior to being provided to the decoder 144.

The memory 148 may be coupled to the encoder 140 and to the decoder 144. The memory 148 may include a non-volatile memory, a random access memory (RAM), a read only memory (ROM), other non-transitory computer-readable media, or a combination thereof. The memory 148 may include a mapping table(s) 151 and word line meta data 152. The mapping table(s) 151 may include one or more mapping tables, such as the encode mapping table 143 or the decode mapping table 147.

The word line meta data 152 may include one or more entries associated with the memory 104. For example, each entry of the one or more entries may correspond to a different word line of the memory 104. Each entry may include frequency table initialization data that may include a key value that is applied to a mapping table to initialize (e.g., randomize) the mapping table. For example, a key value of the word line 106 may be applied to the encode mapping table 143 to initialize the encode mapping table 143 to be used to encode the input data 163 to be stored at the word line 106. As another example, the key value of the word line may be applied to the decode mapping table 147 to initialize (e.g., randomize) the decode mapping table 147 to be used to decode the read data 170 and generate the output data 174. In some embodiments, the word line meta data 152 includes flash transition layer (FTL) mapping information that corresponds to specific addresses in the memory 104 where write data 168 is stored to allow the data to be accessed at a later time. The electronic processor 130 may update the FTL mapping information each time the electronic processor 130 writes data to the memory 104 and/or erases data from the memory 104 in order to keep track of specific addresses in the memory 104 where data has been stored and addresses in the memory that are available for storage of data.

In some embodiments, the mapping table(s) 151, the word line meta data 152, or both, may be stored at the memory 104. In other implementations, the electronic processor 130 may include or may be coupled to a particular memory, such as a random access memory (RAM), that is configured to store the mapping table(s) 151, the word line meta data 152, or both. In some implementations, the particular memory may include the memory 148. Alternatively, or in addition, the electronic processor 130 may include or may be coupled to another memory (not shown), such as a non-volatile memory, a RAM, or a read only memory (ROM). The other memory may be configured to store the mapping table(s) 151, the word line meta data 152, or both. The other memory may be a single memory component, multiple distinct memory components, and/or may include multiple different types (e.g., volatile memory and/or non-volatile) of memory components. In some implementations, the other memory may be included in the access device 160.

The data storage device 102 and the access device 160 may be coupled via a connection (e.g., a communication path 179), such as a bus or a wireless connection. The data storage device 102 may include a first interface (e.g., an access device interface) that enables communication via the communication path 179 between the data storage device 102 and the access device 160.

The access device 160 may include a memory interface (not shown) and may be configured to communicate with the data storage device 102 via the memory interface to read data from and write data to the memory device 103 of the data storage device 102. For example, the access device 160 may operate in compliance with a Joint Electron Devices Engineering Council (JEDEC) industry specification, such as a Universal Flash Storage (UFS) Access Controller Interface specification. As other examples, the access device 160 may operate in compliance with one or more other specifications, such as a Secure Digital (SD) Access Controller specification, as an illustrative, non-limiting example. In some implementations, the data storage device 102 and the access device 160 may be configured to communicate using one or more protocols, such as an eMMC protocol, a universal flash storage (UFS) protocol, a universal serial bus (USB) protocol, a serial advanced technology attachment (SATA) protocol, a peripheral component interconnect express (PCIe), a non-volatile memory express (NVMe), and/or another protocol, as illustrative, non-limiting examples. The access device 160 may communicate with the memory device 103 in accordance with any other suitable communication protocol.

In some implementations, the data storage device 102 may be attached to or embedded within one or more access devices, such as within a housing of the access device 160. For example, the data storage device 102 may be embedded within the access device 160, such as in accordance with a Joint Electron Devices Engineering Council (JEDEC) Solid State Technology Association Universal Flash Storage (UFS) configuration. For example, the data storage device 102 may be configured to be coupled to the access device 160 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a mini SD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). To further illustrate, the data storage device 102 may be integrated within an apparatus (e.g., the access device 160 or another device), such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory.

In other implementations, the data storage device 102 may be implemented in a portable device configured to be selectively coupled to one or more external access devices. For example, the data storage device 102 may be removable from the access device 160 (i.e., "removably" coupled to the access device 160). As an example, the data storage device 102 may be removably coupled to the access device 160 in accordance with a removable universal serial bus (USB) configuration. In still other implementations, the data storage device 102 may be a component (e.g., a solid-state drive (SSD)) of a network accessible data storage system, such as an enterprise data system, a network-attached storage system, a cloud data storage system, etc. In some implementations, the data storage device 102 is coupled to the access device 160 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 102 may be a network-attached storage (NAS) device or a component (e.g., a solid-state drive (SSD) device) of a data center storage system, an enterprise storage system, or a storage area network.

The access device 160 may include an electronic processor and a memory that may be similar to the electronic processor 130 and the memory 148 described above with respect to the data storage device 102. The memory of the access device 160 may be configured to store data and/or instructions that may be executable by the electronic processor of the access device 160. The memory of the access device 160 may be a single memory or may include multiple memories, such as one or more non-volatile memories, one or more volatile memories, or a combination thereof. The access device 160 may issue one or more commands to the data storage device 102, such as one or more requests to erase data, to read data from, or to write data to the memory device 103 of the data storage device 102. For example, the access device 160 may be configured to provide data, such as data 162, to be stored at the memory device 103 or to request data to be read from the memory device 103. As another example, the access device 160 may provide different types of requests to erase data, such as a logical erase request and a physical erase request (in response to which the data storage device 102 may perform a physical block erase or a virtual physical erase of a portion of a block of the memory 104) as explained in greater detail below.

The memory device 103 of the data storage device 102 may include one or more memory dies, such as one memory die, two memory dies, eight memory dies, or another number of memory dies. The memory device 103 includes the memory 104, such as a non-volatile memory of storage elements included in a memory die of the memory device 103. For example, the memory 104 may include a flash memory, such as a NAND flash memory, or a resistive memory, such as a resistive random access memory (ReRAM), as illustrative, non-limiting examples. In some implementations, the memory 104 may include or correspond to a memory die of the memory device 103. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of memory cells having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory 104 may include multiple storage elements (e.g., also referred to herein as memory cells), such as one or more representative blocks 107 of storage elements. For example, each of the blocks 107 may be a NAND flash erase block. Each storage element (i.e., cell) of the memory 104 may be programmable to a state (e.g., a threshold voltage in a flash configuration or a resistive state in a resistive memory configuration) that indicates one or more values, such as one or more bit values (see FIG. 2). In some embodiments, the memory 104 is a flash memory that includes a plurality of blocks 107. Each block 107 of the memory 104 may include one or more word lines, such as a representative word line (WL) 106. Although FIG. 1 only illustrates four representative word lines in each block 107, in other implementations, the memory 104 may include any number of word lines and each block 107 may include any number of word lines. For example, each block 107 of the memory 104 may include 96 word lines. Similarly, while FIG. 1 only illustrates two representative blocks 107, in other implementations, the memory 104 may include any number of blocks 107. Each word line may include one or more storage elements (i.e., cells). For example, the representative word line 106 includes representative storage elements, such as a first storage element 109 and a second storage element 110 among other storage elements (i.e., cells 109). A word line may be configurable to operate as a single-level-cell (SLC) word line, as a multi-level-cell (MLC) word line, or as a tri-level-cell (TLC) word line, as illustrative, non-limiting examples. To illustrate, each storage element of a particular word line may be configured to be programmed to a corresponding threshold voltage (e.g., a voltage state) that represents a single bit value or a multi-bit value, such as a two bit value, a three bit value, a four bit value, etc. (see FIG. 2). In some embodiments such as embodiments where the memory 104 includes a 3D memory configuration, each word line 106 may include a plurality of strings (e.g., four strings). In such embodiments, each string includes storage elements 109 (i.e., cells 109) where data can be stored. Throughout this specification, the term "word line" is descriptive of the word lines 106 described above as well as strings within a word line of a 3D memory. In other words, the term "word line" represents a unit or separately-addressed portion of a block 107 of the memory 104 where the unit or separately-addressed portion includes a plurality of cells 109 configured to store data.

The memory device 103 may include support circuitry, such as read/write (R/W) circuitry 105, to support operation of one or more memory dies of the memory device 103. Although depicted as a single component, the read/write circuitry 105 may be divided into separate components of the memory device 103, such as read circuitry and write circuitry. The write circuitry may be configured to program each of the multiple storage elements to a corresponding voltage state. The read circuitry may be configured to perform a read operation on the multiple storage elements to determine, for each storage element, a read group of bits corresponding to a programmed voltage state of the storage element. The R/W circuitry 105 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The memory device 103 may be coupled via a bus 120 to the electronic processor 130. For example, the bus 120 may include one or more channels to enable the electronic processor 130 to communicate with a single memory die of the memory device 103. As another example, the bus 120 may include multiple distinct channels to enable the electronic processor 130 to communicate with each memory die of the memory device 103 in parallel with, and independently of, communication with other memory dies of the memory device 103. The electronic processor 130 is configured to receive data and instructions from the access device 160 and to send data to the access device 160. For example, the electronic processor 130 may send data to the access device 160 via the communication path 179, and the electronic processor 130 may receive data from the access device 160 via the communication path 179.

The electronic processor 130 is configured to send data and commands to the memory 104 and to receive data from the memory 104. For example, the electronic processor 130 is configured to send write data 168 and a write command to cause the memory 104 to store the write data 168 to an address of the memory 104. The write command may specify a physical address of a portion of the memory 104 (e.g., a physical address of a word line of the memory 104) that is to store the data. The electronic processor 130 may also be configured to send data and commands to the memory 104 associated with background scanning operations, garbage collection operations, and/or wear leveling operations, etc., as illustrative, non-limiting examples. The electronic processor 130 is configured to send a read command to the memory 104 to access data from a specified address of the memory 104. The read command may specify the physical address of a portion of the memory 104 (e.g., a physical address of a word line of the memory 104). The electronic processor 130 is also configured to send erasing commands to the memory 104 to erase data from a specified address of the memory 104 (e.g., physical block erasing and virtual physical erasing of a portion of a block of the memory 104) as explained in greater detail below.

Although one or more components of the data storage device 102 have been described with respect to the electronic processor 130, in other implementations, certain components may be included in the memory device 103 (e.g., the memory 104). For example, the encoder 140, the decoder 144, or both may be included in the memory device 103. Alternatively, or in addition, one or more functions as described above with reference to the electronic processor 130 may be performed at or by the memory device 103. For example, one or more functions of the encoder 140, the decoder 144, or both may be performed by components and/or circuitry included in the memory device 103.

Alternatively, or in addition, one or more components of the data storage device 102 may be included in the access device 160. For example, one or more of the encoder 140, the decoder 144, or both may be included in the access device 160. Alternatively, or in addition, one or more functions, as described above with reference to the electronic processor 130, may be performed at or by the access device 160. As an illustrative, non-limiting example, the access device 160 may be configured to encode data (as described with reference to the encoder 140) and may provide the encoded data to the data storage device 102 as the data 162.

Figure 2:
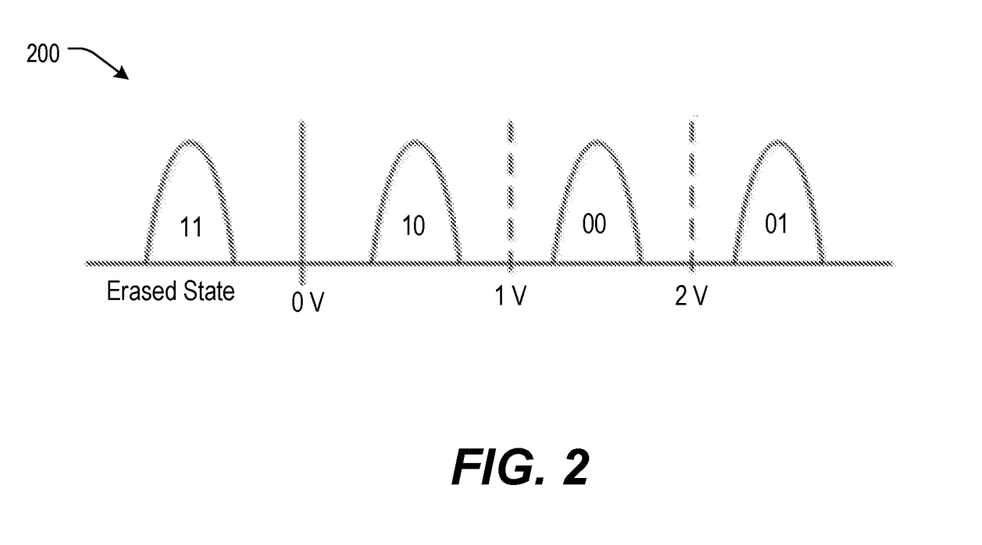
FIG. 2 illustrates an example diagram of four possible states of a cell of the memory of the memory device of FIG. 1.

In some embodiments, when the memory 104 is of a certain type of memory (e.g., NAND flash memory), the cells of the memory 104 can only be programmed (i.e., written to) by increasing the voltage state of the cells. For example, FIG. 2 illustrates a diagram 200 of four possible states of a cell of the memory 104 that is configured as a two-bit cell. The two-bit cell represented by FIG. 2 is an example, and in other embodiments, the number of bits per cell of the memory 104 may be more or less than two. As shown in FIG. 2, each cell of the memory 104 may initially be in an erased state "11" that includes the lowest voltage of the four possible states. Data can be written to the memory 104 for storage by increasing the voltage of one or more cells to one of the higher voltage states "10," "00," or "01." When data is written to a cell such that the cell is in one of the middle voltage states "10" or "00," additional data may overwrite the existing data in the same cell (i.e., the cell can be reprogrammed) by increasing the voltage of the cell to a higher voltage state (e.g., the highest voltage state "01"). However, the cell cannot be reprogrammed to a lower voltage state regardless of the voltage state until the cell is physically erased. In other words, the cells can only be programmed and/or reprogrammed by increasing their voltage state.

As explained previously herein, physical erasing of cells in the memory 104 has been limited to performing compaction to relocate data that is not intended to be erased and then erasing an entire block 107 of the memory 104. In other words, in conventional memories, portions of data of the memory 104 that are smaller than an entire block 107 (e.g., one or more word lines 106 and/or one or more cells 109) cannot be physically erased without performing potentially large amounts of compaction and physically erasing the entire block 107 in which these smaller portions of data are located.

Unlike a physical erase where cells are reset to their lowest voltage state (i.e., erased state) "11," logical erasing of cells of the memory 104 is possible at a more granular level such as based on a specific word line or based on specific cells. As explained previously herein, logically erasing cells of the memory 104 includes removing flash transition layer (FTL) mapping information of the portion of data of the memory 104 to be erased such that any access to that portion of data of the memory 104 is avoided. For example, in response to receiving a logical erase request from the access device 160 that indicates a portion of data to be logically erased from the memory 104, the electronic processor 130 is configured to identify a block of the memory 104, a word line of the block, and a memory fragment of the word line where the portion of data is stored. The electronic processor 130 may be configured to identify this address information of the portion of data to be erased by accessing FTL mapping information. Also in response to the logical erase request, the electronic processor 130 is configured to remove the address information corresponding to the memory fragment from the FTL mapping information such that the portion of data is no longer accessible through use of the FTL mapping information. However, after the portion of data of the memory 104 is logically erased, the portion of data is still physically present in the memory 104 and, thus, potentially accessible (i.e., the data has not been securely erased such that the data is permanently inaccessible).

Accordingly, conventional memories have not been configured to physically erase data stored in the memory 104 at a finer level of granularity than block granularity, and physical block erases of the memory 104 may decrease performance of the memory 104 as explained previously herein. Thus, there is a technological problem with respect to securely erasing data that has previously been stored in a memory (e.g., a NAND flash memory).

Figure 3:
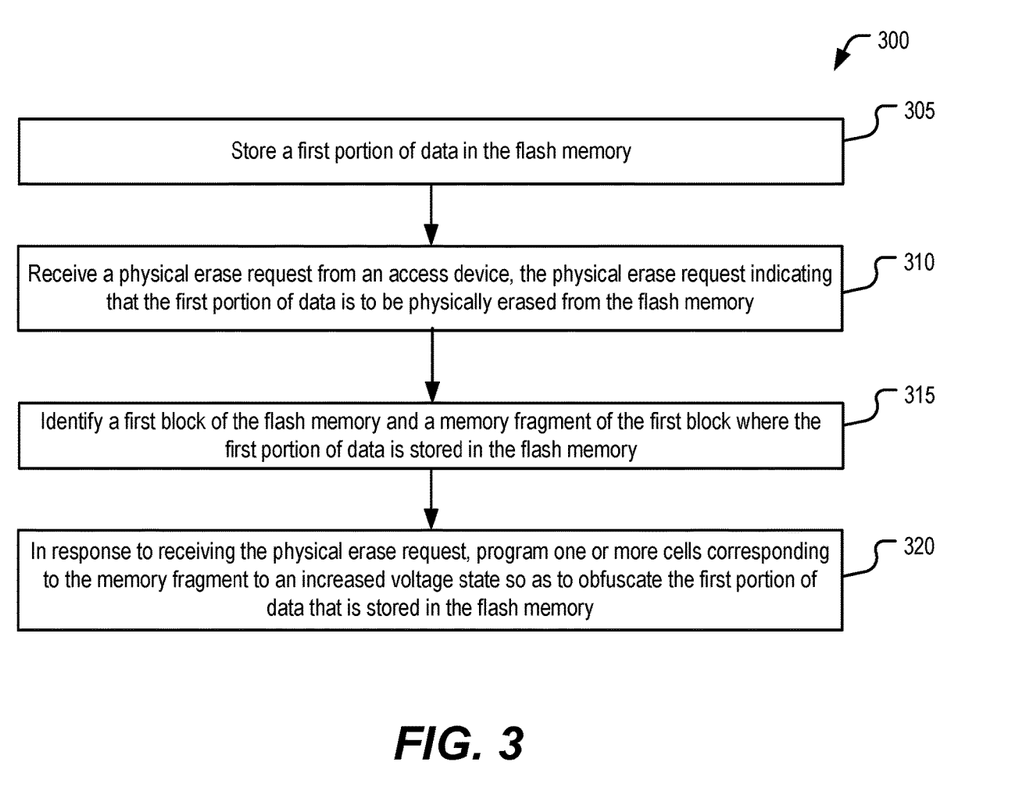
FIG. 3 illustrates an example flow chart diagram of a method of performing a virtual physical erase (i.e., a secure erase) of a portion of the memory of FIG. 1.

To address this technological problem, the electronic processor 130 performs, in one instance, a method 300 illustrated in FIG. 3. In some embodiments, the method 300 is executed by the electronic processor 130 to perform a virtual physical erase of the memory 104 that securely erases data stored in a portion of the memory 104 that is smaller than an entire block without physically erasing the entire block where the portion of data is stored. Accordingly, the method 300 allows portions of data in the memory 104 to be securely erased while performing less compaction (or no compaction at all) than is required to physically erase the entire block where the portion of the data is stored. The method 300 addresses the above-noted technological problem by increasing performance and NAND endurance of the memory 104, and decreasing power, processing time, and write amplification of the memory 104 by reducing or eliminating compaction that occurs in conventional memories that are configured to physically erase stored data only at block granularity. In other words, the method 300 allows portions of the memory 104 to be securely erased at word line granularity or cell granularity in contrast with conventional memories that are only configured to securely erase portions of the memory at block granularity.

FIG. 3 illustrates a flow chart diagram of the method 300 performed by the electronic processor 130 to perform a virtual physical erase (i.e., a secure erase) of a portion of the memory 104. While a particular order of processing steps is indicated in FIG. 3 as an example, timing and ordering of such steps may vary where appropriate without negating the purpose and advantages of the examples set forth in detail throughout the remainder of this disclosure.

At block 305, the electronic processor 130 stores a first portion of data in the memory 104 (referred to hereafter as a flash memory 104). For example, the electronic processor 130 stores write data 168 in the flash memory 104 as explained previously herein. In some situations, the first portion of data is smaller than an entire block of the flash memory 104. In some situations, the first portion of data is smaller than a word line of the flash memory 104. In other words, the first portion of data may be stored in a plurality of cells within a word line 410 of a block 407 of the flash memory 104 (see FIG. 4).

At block 310, the electronic processor 130 receives a physical erase request from the access device 160. In some embodiments, the physical erase request indicates that the first portion of data is to be physically erased from the flash memory 104 (i.e., securely erased such that the first portion of data is permanently inaccessible). In some situations, the physical erase request indicates that the first portion of data may be virtually physically erased in accordance with the remaining blocks of the method 300 of FIG. 3. In other situations, the physical erase request may indicate that the first portion of data is to be physically erased from the flash memory 104 in a conventional manner by performing compaction and physically erasing an entire block 407 where the first portion of data is stored. In such situations, the electronic processor 130 performs compaction and physically erases the entire block 407 of the memory 104 in a conventional manner and may not perform the remaining blocks of the method 300 of FIG. 3.

Figure 4:
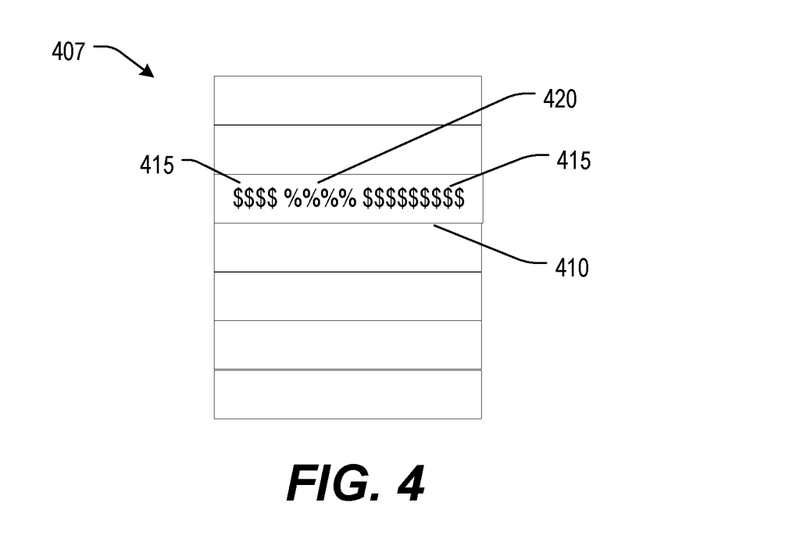
FIG. 4 illustrates an example block of the memory of FIG. 1.

At block 315, in response to receiving the physical erase request from the access device 160, the electronic processor 130 identifies a first block 407 of the flash memory 104 and a memory fragment 420 of the first block 407 where the first portion of data is stored in the flash memory 104 (see FIG. 4). In some embodiments, the electronic processor 130 also identifies a first word line 410 of the first block 407 that includes the memory fragment 420. In other words, the memory fragment 420 corresponds to the address(es) of the cells where the first portion of data is stored in the flash memory 104. As explained previously herein, the electronic processor 130 may be configured to identify the address(es) of these cells (i.e., the first block 407, the first word line 410 of the first block 407, and the memory fragment 420 of the first word line 410) by accessing flash transition layer (FTL) mapping information included in the word line meta data 152.

At block 320, in response to receiving the physical erase request, the electronic processor 130 programs one or more cells corresponding to the memory fragment 420 to an increased voltage state so as to obfuscate the first portion of data that is stored in the flash memory 104 (i.e., the electronic processor 130 performs NAND painting of the cells corresponding to the memory fragment 420). In some embodiments, the electronic processor 130 is configured to program the cells corresponding to the memory fragment 420 to a highest programmable voltage state (e.g., "01" in FIG. 2) so as to obfuscate the first portion of data that is stored in the flash memory 104 in response to receiving the physical erase request. In some flash memories, it may not be possible to program all cells corresponding to the memory fragment 420 to the highest programmable voltage state. Accordingly, in alternative embodiments, the electronic processor 130 is configured to randomly program the one or more cells corresponding to the memory fragment 420 to a random increased voltage state based on a random key so as to obfuscate the first portion of data that is stored in the flash memory 104 in response to receiving the physical erase request. In such embodiments, different cells of the memory fragment 420 are randomly programmed to increase by, for example, zero, one, two, or three voltage states (see FIG. 2).

In each of the above embodiments of block 320, the electronic processor 130 obfuscates the first portion of data stored in the memory fragment 420 such that the first portion of data is permanently inaccessible (i.e., securely erased). For example, in the embodiment where the cells of the memory fragment 420 are programmed to their highest programmable voltage state (e.g., "01" in FIG. 2), the memory fragment 420 will not provide any comprehendible data if the memory fragment 420 is later read by the electronic processor 130 or another device. In other words, the obfuscated memory fragment 420 includes cells that all have the same voltage state (i.e., the highest programmable voltage state) similar to when the cells are physically erased and all have the same voltage state (i.e., the lowest voltage state also known as the erased state). Similarly, in the embodiment where the cells of the memory fragment 420 are programmed to a random increased voltage state based on a random key, the memory fragment 420 will also not provide any comprehendible data if the memory fragment 420 is read by the electronic processor 130 or another device. Additionally, because the cells can only be reprogrammed by increasing their voltage states as described previously herein, the cell cannot be reprogrammed to a lower voltage state until the cell is physically erased. Thus, the data that was stored in the memory fragment 420 before obfuscation cannot be recovered. Accordingly, when the electronic processor 130 programs the cells of the memory fragment 420 to their highest programmable voltage state or to a random increased voltage state (at block 320), the electronic processor 130 virtually physically erases the memory fragment 420 (i.e., performs a secure erase) without physically erasing the entire block 407 in which the memory fragment 420 is located. In other words, the block 407 in which the memory fragment 420 is located includes at least one cell that has been previously programmed to a voltage state to store other data that is not to be physically erased (e.g., the cells of the word lines of block 407 besides the word line 410). This at least one cell remains in the previously-programmed voltage state after the electronic processor 130 programs the one or more cells corresponding to the memory fragment 420 to the increased voltage state so as to obfuscate the first portion of data that is stored in the flash memory 104.

In some embodiments, the electronic processor 130 may be configured to implement the different embodiments of block 320 (i.e., highest programmable voltage state reprogramming or random increased voltage state reprogramming) based on application characteristics and NAND die quality and parameters for different flash memories. For example, for some flash memories, programming many consecutive cells with the highest programmable voltage state may affect neighboring cells such that random increased voltage state reprogramming may be chosen for implementation by the electronic processor 130. As another example, when security is more important than possible effects on neighboring cells, the highest programmable voltage state reprogramming may be chosen for implementation by the electronic processor 130 because the highest programmable voltage state reprogramming does not use a random key and, thus, may be more secure.

In any of the above-noted embodiments, the electronic processor 130 may be configured to program the cells corresponding to the memory fragment 420 to be at an increased voltage state by at least one of one-shot programming and incremental programming. In some embodiments, one-shot programming of the cells causes the electronic processor 130 to program the cells to the increased voltage state (e.g., their highest programmable voltage state) in a single programming cycle. On the other hand, incremental programming of the cells causes the electronic processor 130 to program the cells to the increased voltage (e.g., their highest programmable voltage state) in multiple programming cycles such that the cells are incrementally reprogrammed to the increased voltage. Similar to the choice between having the electronic processor 130 implement highest programmable voltage state reprogramming or random increased voltage state reprogramming explained above, the electronic processor 130 may be configured to implement one-shot programming and/or incremental programming depending on application characteristics and NAND die quality and parameters.

In some embodiments, the electronic processor 130 may be configured to dynamically select (i) between highest programmable voltage state reprogramming or random increased voltage state reprogramming; and/or (ii) between one-shot programming or incremental programming. In some embodiments, the electronic processor 130 may make such a selection based on memory type (e.g., 2D or 3D), age of the flash memory 104, quality of the blocks of the flash memory 104, other factors, and/or a combination thereof. For example, in response to determining that the age of the flash memory 104 exceeds a predetermined threshold, the electronic processor 130 may switch from using highest programmable voltage state reprogramming to using random increased voltage state reprogramming during execution of the method 300 to attempt to extend the lifetime of the flash memory 104. As another example, the electronic processor 130 may determine whether to use highest programmable voltage state reprogramming or random increased voltage state reprogramming based on a security level at which data is to be erased (e.g., highest programmable voltage state reprogramming may provide a higher level of security because it does not involve a random key). As another example, the electronic processor 130 may use one-shot programming when the quality of the blocks of the flash memory 104 is high in order to reduce increased latency caused by incremental programming. However, in response to determining that the quality of the blocks of the flash memory 104 has decreased below a predetermined quality threshold, the electronic processor 130 may switch to use incremental programming to slow and/or prevent further decrease in block quality/memory health.

In some embodiments, at block 320, the electronic processor 130 is configured to program the cells of the entire word line(s) 410 in which the memory fragment 420 is located to their highest programmable voltage state or to a random increased voltage state. In such embodiments, the electronic processor 130 is configured to compact other data included in the word line(s) 410 in which the memory fragment 420 is located by relocating the other data to a second block in the flash memory 104 because the other data is not included in the first portion of data to be physically erased from the flash memory 104. Then, in response to receiving the physical erase request, the electronic processor 130 programs the cells of the word line(s) 410 in which the memory fragment 420 is located to an increased voltage state so as to obfuscate the first portion of data that is stored in the flash memory 104. While this embodiment involves compaction of some data, the amount of data compacted in one or more word lines 410 is significantly less than the amount of data compacted during a conventional physical erase of an entire block 107 of the flash memory 104. Thus, this embodiment also addresses the above-noted technological problems of conventional physical erasing of an entire block of a flash memory. Similar to the choice between the two above-noted embodiments regarding highest programmable voltage state reprogramming or random increased voltage state reprogramming, the electronic processor 130 may be configured to implement virtual physical erasing with word line granularity as described in this embodiment or with cell granularity as described above based on, for example, application characteristics and NAND die quality and parameters. The below description of FIG. 4 further explains the details of and the differences between virtual physical erasing with word line granularity and with cell granularity.

FIG. 4 illustrates an example block 407 of the flash memory 104. Each row of the block 407 represents a word line. The number of word lines shown in block 407 is merely an example. In other embodiments, the number of word lines may be greater than or less than the amount of word lines shown in FIG. 4. The block 407 includes representative word line 410 that includes a plurality of cells that are programmed to different voltage states to store data. Different symbols in the word line 410 represent different portions of data in accordance with the description of the method 300 above. The data 415 represented by the "$" symbol indicates data that is not to be erased. On the other hand, the data represented by the "%" symbol indicates a memory fragment 420 where the first portion of data is stored that is to be securely erased based on the physical erase request received at block 310 of FIG. 3. While FIG. 4 shows only one representative word line 410 that includes data, this diagram is for illustrative purposes only, and the other word lines of the block 407 may include data that would be represented by the "$" in this example because only the memory fragment 420 is to be erased in this example.

Referring back to the embodiment where the electronic processor 130 is configured to implement virtual physical erasing with cell granularity, the electronic processor 130 may program the cells corresponding to the memory fragment 420 to an increased voltage state so as to obfuscate the first portion of data that is stored in memory fragment 420. In this embodiment, the electronic processor 130 may not perform any compaction to relocate the data 415 to other word lines or blocks of the flash memory 104. Rather, the electronic processor 130 may re-program the word line 410 such that the cells corresponding to the data 415 are reprogrammed using the erased state voltage "11" (see FIG. 2) because reprogramming these cells using the erased state voltage does not affect the current voltage state of the cells. As explained previously herein, in some embodiments, the cells are only programmable by increasing the voltage of the cell to a higher voltage state, and the cell cannot be reprogrammed to a lower voltage state until the cell is physically erased by physically erasing the entire block 407. Thus, reprogramming the cells corresponding to the data 415 using the erased state voltage maintains the status quo of these cells such that the data 415 is unaffected. Accordingly, in the embodiment where the electronic processor 130 is configured to implement virtual physical erasing with cell granularity, the electronic processor 130 reprograms the cells corresponding to the data 415 using the erased state voltage and reprograms the cells of the memory fragment 420 to their highest programmable voltage state or to a random increased voltage state to obfuscate the data stored in the memory fragment 420. Because the electronic processor 130 only reprograms the word line 410 during this process, the remaining word lines of the block 407 are unaffected and retain any previously-stored data, similar to the cells corresponding to the data 415.

Alternatively, referring back to the embodiment where the electronic processor 130 is configured to implement virtual physical erasing with word line granularity, the electronic processor 130 may program all of the cells of the word line 410 where the memory fragment 420 is located to an increased voltage state so as to obfuscate the first portion of data that is stored in memory fragment 420. In this embodiment, the electronic processor 130 compacts the data 415 by relocating the data 415 to other word lines or other blocks in the flash memory 104 before reprogramming the cells of the memory fragment 420 to their highest programmable voltage state or to a random increased voltage state to obfuscate the data stored in the memory fragment 420. Similar to the embodiment including virtual erasing with cell granularity, because the electronic processor 130 only reprograms the word line 410 during this process, the remaining word lines of the block 407 are unaffected and retain any previously-stored data, similar to the data 415 that was relocated by performing compaction.

In some embodiments, in response to programming one or more cells corresponding to the memory fragment 420 to the increased voltage state so as to obfuscate the first portion of data that is stored in the flash memory 104, the electronic processor 130 is configured to remove address information corresponding to the memory fragment 420 from the FTL mapping information included in the word line meta data 152. In other words, the electronic processor 130 is configured to update the FTL mapping information each time the electronic processor 130 programs one or more cells to the increased voltage state so as to obfuscate the data that was stored in the flash memory 104. Such updates allow the electronic processor 130 to keep track of "holes" in the flash memory 104 caused by the virtual physical erasings. The cells of the flash memory 104 that have been virtually physically erased (and/or logically erased) may be referred to as holes because these cells are not available for reprogramming to store additional data until a conventional physical block erase is performed. Thus, the electronic processor 130 is configured to flag the cells that have been virtually physically erased by updating FTL mapping information to ensure that these cells are not reprogrammed until the they have been returned to the erased state through a physical block erase.

In some embodiments, the electronic processor 130 is configured to monitor an amount of holes in one or more blocks of the flash memory 104 to determine whether a physical block erase should be performed. For example, the electronic processor 130 is configured to determine that a predetermined percentage (e.g., 25%, 40%, 60%, or the like) of word lines of the first block 407 include cells that have been programmed to the increased voltage state so as to obfuscate data that was stored in the flash memory 104. In other words, the electronic processor 130 is configured to determine that the percentage of word lines that have been programmed to the increased, obfuscated voltage state exceeds a predetermined threshold. In response to determining that the predetermined percentage of word lines of the first block 407 have been programmed to the increased voltage state so as to obfuscate the data that was stored in the flash memory 104, the electronic processor 130 may be configured to perform a conventional physical block erase of the first block 407. In other words, the electronic processor 130 may be configured to compact other data included in the first block 407 by relocating the other data to a second block in the flash memory 104, and perform a physical block erase of the first block 407 by programming the cells of the first block 407 to a lowest programmable voltage state (i.e., the erased state "11" as shown in FIG. 2). In some embodiments, the electronic processor 130 is configured to determine that the predetermined percentage of word lines of the first block 407 include cells that have been programmed to the increased, obfuscated voltage state by accessing the FTL mapping information. In some embodiments, when the electronic processor 130 monitors the amount of holes in one or more blocks of the flash memory 104, the electronic processor 130 also takes into account data that has been logically erased from the flash memory 104 (e.g., by accessing the FTL mapping information which may track which portions of the flash memory 104 have been logically erased).

In some embodiments, after performing block 315 but before performing block 320 of the method 300, the electronic processor 130 is configured to determine whether a predetermined percentage of word lines of the first block 407 identified (at block 315) include cells that have been programmed to the increased voltage state so as to obfuscate data that was stored in the flash memory 104. In such embodiments, when the percentage of word lines that have been programmed to the increased, obfuscated voltage state exceeds a predetermined threshold, the electronic processor 130 may perform a conventional physical block erase of the identified first block 407. Alternatively, when the percentage of word lines that have been programmed to the increased, obfuscated voltage state does not exceed the predetermined threshold, the electronic processor 130 may execute block 320 to perform a virtual physical erase of the identified memory fragment 420 as explained previously herein.

In some embodiments, the predetermined percentage of word lines that include holes as described above is a dynamic threshold that is adjustable by the electronic processor 130. For example, because performing a physical block erase (i.e., garbage collection) has an attached latency, the electronic processor 130 may increase the predetermined percentage to delay a physical block erase to avoid latency when writing new data to the flash memory 104 if other blocks of the flash memory 104 have sufficient space to store the new data.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A data storage device comprising:
   a flash memory, wherein the flash memory includes a plurality of blocks that include a plurality of word lines;
   an electronic processor configured to:
      store a first portion of data in the flash memory,
      receive a physical erase request from an access device, the physical erase request indicating that the first portion of data is to be physically erased from the flash memory,
      identify a first block of the flash memory and a memory fragment of the first block where the first portion of data is stored in the flash memory, and
      in response to receiving the physical erase request, program one or more identified cells of the memory fragment to an increased voltage state so as to permanently obfuscate the first portion of data that is stored in the flash memory,
      wherein the memory fragment is smaller than a word line.

2. The data storage device of claim 1, wherein the electronic processor is configured to program the one or more cells corresponding to the memory fragment to a highest programmable voltage state so as to obfuscate the first portion of data that is stored in the flash memory in response to receiving the physical erase request.

3. A data storage device comprising:
   a flash memory, wherein the flash memory includes a plurality of blocks that include a plurality of word lines;
   an electronic processor configured to:
      store a first portion of data in the flash memory,
      receive a physical erase request from an access device, the physical erase request indicating that the first portion of data is to be physically erased from the flash memory,
      identify a first block of the flash memory and a memory fragment of the first block where the first portion of data is stored in the flash memory, and
      in response to receiving the physical erase request, program one or more cells corresponding to the memory fragment to a random increased voltage state based on a random key to permanently obfuscate the first portion of data that is stored in the flash memory.

4. The data storage device of claim 1, wherein the electronic processor is further configured to:
   identify a first word line of the first block, the first word line including the memory fragment where the first portion of data is stored in the flash memory;
   compact other data included in the first word line by relocating the other data to a second block in the flash memory, wherein the other data is not included in the first portion of data to be physically erased from the flash memory; and
   in response to receiving the physical erase request, program cells of the first word line to the increased voltage state so as to obfuscate the first portion of data that is stored in the flash memory.

5. The data storage device of claim 1, wherein the electronic processor is configured to program the one or more cells corresponding to the memory fragment to the increased voltage state by at least one of one-shot programming and incremental programming.

6. The data storage device of claim 1, wherein the electronic processor is further configured to:
   determine that a predetermined percentage of word lines of the first block include cells that have been programmed to the increased voltage state so as to obfuscate data that was stored in the flash memory; and
   in response to determining that the predetermined percentage of word lines of the first block have been programmed to the increased voltage state so as to obfuscate the data that was stored in the flash memory,
      compact other data included in the first block by relocating the other data to a second block in the flash memory, and
      performing a physical block erase of the first block by programming the cells of the first block to a lowest programmable voltage state.

7. The data storage device of claim 6, wherein the electronic processor is configured to determine that the predetermined percentage of word lines of the first block include cells that have been programmed to the increased voltage state so as to obfuscate the data that was stored in the flash memory by accessing flash transition layer (FTL) mapping information updated by the electronic processor each time the electronic processor programs cells to the increased voltage state so as to obfuscate the data that was stored in the flash memory.

8. The data storage device of claim 1, wherein the electronic processor is configured to identify the first block of the flash memory and the memory fragment of the first block by accessing flash transition layer (FTL) mapping information;
    wherein the electronic processor is configured to remove address information corresponding to the memory fragment from the FTL mapping information in response to programming the one or more cells corresponding to the memory fragment to the increased voltage state so as to obfuscate the first portion of data that is stored in the flash memory.

9. The data storage device of claim 1, wherein the electronic processor is further configured to:
    store a second portion of data in the flash memory;
    receive a logical erase request from the access device, the logical erase request indicating that the second portion of data is to be logically erased from the flash memory;
    identify a second block of the flash memory and a second memory fragment of the second block where the second portion of data is stored in the flash memory by accessing flash transition layer (FTL) mapping information; and
    in response to receiving the logical erase request, remove address information corresponding to the second memory fragment from the FTL mapping information such that the second portion of data is no longer accessible through use of the FTL mapping information but still physically present in the flash memory.

10. The data storage device of claim 1, wherein the first block includes at least one cell that has been previously programmed to a voltage state to store other data that is not to be physically erased; and
    wherein the at least one cell remains in the previously-programmed voltage state after the electronic processor programs the one or more cells corresponding to the memory fragment to the increased voltage state so as to obfuscate the first portion of data that is stored in the flash memory.

11. A method of performing a virtual physical erase of a data storage device, the method comprising:
    storing, using an electronic processor of the data storage device, a first portion of data in a flash memory of the data storage device, the flash memory including a plurality of blocks that include a plurality of word lines;
    receiving, using the electronic processor, a physical erase request from an access device, the physical erase request indicating that the first portion of data is to be physically erased from the flash memory;
    identifying, using the electronic processor, a first block of the flash memory and a memory fragment of the first block where the first portion of data is stored in the flash memory; and
    in response to receiving the physical erase request, programming, using the electronic processor, one or more identified cells of the memory fragment to an increased voltage state so as to permanently obfuscate the first portion of data that is stored in the flash memory,
    wherein the memory fragment is smaller than a word line.

12. The method of claim 11, further comprising:
    selecting, using the electronic processor and based on at least one of the group consisting of memory type of the flash memory, age of the flash memory, and quality of blocks of the flash memory, between (i) programming the one or more cells to the increased voltage state by programming the one or more cells corresponding to the memory fragment to a highest programmable voltage state so as to obfuscate the first portion of data that is stored in the flash memory in response to receiving the physical erase request and (ii) programming the one or more cells to the increased voltage state by programming the one or more cells corresponding to the memory fragment to a random increased voltage state based on a random key so as to obfuscate the first portion of data that is stored in the flash memory in response to receiving the physical erase request.

13. The method of claim 11, wherein programming the one or more cells to the increased voltage state includes programming the one or more cells corresponding to the memory fragment to a highest programmable voltage state so as to obfuscate the first portion of data that is stored in the flash memory in response to receiving the physical erase request.

14. The method of claim 11, wherein programming the one or more cells to the increased voltage state includes programming the one or more cells corresponding to the memory fragment to a random increased voltage state based on a random key so as to obfuscate the first portion of data that is stored in the flash memory in response to receiving the physical erase request.

15. The method of claim 11, further comprising:
    identifying, using the electronic processor, a first word line of the first block, the first word line including the memory fragment where the first portion of data is stored in the flash memory;
    compacting, using the electronic processor, other data included in the first word line by relocating the other data to a second block in the flash memory, wherein the other data is not included in the first portion of data to be physically erased from the flash memory; and
    in response to receiving the physical erase request, programming cells of the first word line to the increased voltage state so as to obfuscate the first portion of data that is stored in the flash memory.

16. The method of claim 11, wherein programming the one or more cells corresponding to the memory fragment to the increased voltage state includes programming, using the electronic processor, the one or more cells by at least one of one-shot programming and incremental programming.

17. The method of claim 11, further comprising:
    determining, using the electronic processor, that a predetermined percentage of word lines of the first block include cells that have been programmed to the increased voltage state so as to obfuscate data that was stored in the flash memory; and
    in response to determining that the predetermined percentage of word lines of the first block have been programmed to the increased voltage state so as to obfuscate the data that was stored in the flash memory,
        compacting, using the electronic processor, other data included in the first block by relocating the other data to a second block in the flash memory, and
        performing, using the electronic processor, a physical block erase of the first block by programming the cells of the first block to a lowest programmable voltage state.

18. The method of claim 17, wherein determining that the predetermined percentage of word lines of the first block include cells that have been programmed to the increased voltage state includes determining that the predetermined percentage of word lines of the first block include cells that have been programmed to the increased voltage state by accessing flash transition layer (FTL) mapping information updated by the electronic processor each time the electronic processor programs cells to the increased voltage state so as to obfuscate the data that was stored in the flash memory.

19. The method of claim 11, further comprising:
storing, using the electronic processor, a second portion of data in the flash memory;
receiving, using the electronic processor, a logical erase request from the access device, the logical erase request indicating that the second portion of data is to be logically erased from the flash memory;
identifying, using the electronic processor, a second block of the flash memory and a second memory fragment of the second block where the second portion of data is stored in the flash memory by accessing flash transition layer (FTL) mapping information; and
in response to receiving the logical erase request, removing, using the electronic processor, address information corresponding to the second memory fragment from the FTL mapping information such that the second portion of data is no longer accessible through use of the FTL mapping information but still physically present in the flash memory.

20. The method of claim 11, wherein the first block includes at least one cell that has been previously programmed to a voltage state to store other data that is not to be physically erased; and
wherein the at least one cell remains in the previously-programmed voltage state after programming, using the electronic processor, of the one or more cells corresponding to the memory fragment to the increased voltage state so as to obfuscate the first portion of data that is stored in the flash memory.

* * * * *